United States Patent
Emsley et al.

(10) Patent No.: US 7,213,257 B1
(45) Date of Patent: May 1, 2007

(54) DETERMINING PHASE LINEARITY IN CATV DISTRIBUTION SYSTEMS

(75) Inventors: Brett W. Emsley, Indianapolis, IN (US); Gregg Stephen Rodgers, Noblesville, IN (US)

(73) Assignee: Trilithic, Inc., Indianapolis, IN (US)

( * ) Notice: Subject to any disclaimer, the term of this patent is extended or adjusted under 35 U.S.C. 154(b) by 1037 days.

(21) Appl. No.: 10/088,127
(22) PCT Filed: Sep. 15, 2000
(86) PCT No.: PCT/US00/25349

§ 371 (c)(1),
(2), (4) Date: Mar. 14, 2002

(87) PCT Pub. No.: WO01/20916

PCT Pub. Date: Mar. 22, 2001

Related U.S. Application Data

(60) Provisional application No. 60/154,131, filed on Sep. 15, 1999.

(51) Int. Cl.
*H04N 7/173* (2006.01)
(52) U.S. Cl. .............. 725/107; 348/180; 348/192; 455/67.16; 725/118
(58) Field of Classification Search .............. 725/107, 725/118, 121, 124–126, 131, 148, 151; 348/192, 348/FOR. 175, FOR. 176, 180–181; 455/FOR. 219, 455/FOR. 231, FOR. 226, 67.11, 67.14, 455/67.16; 375/224, 226
See application file for complete search history.

(56) References Cited

U.S. PATENT DOCUMENTS

| | | | | |
|---|---|---|---|---|
| 5,412,694 A | * | 5/1995 | Sato et al. | 375/330 |
| 5,453,714 A | * | 9/1995 | Madsen | 329/301 |
| 5,784,413 A | * | 7/1998 | Chen | 375/308 |
| 5,809,089 A | * | 9/1998 | Vasic | 375/341 |
| 6,239,660 B1 | * | 5/2001 | Dekker | 331/18 |
| 6,385,267 B1 | * | 5/2002 | Bowen et al. | 375/376 |
| 6,389,087 B1 | * | 5/2002 | Heinonen et al. | 375/354 |

* cited by examiner

*Primary Examiner*—Ngoc Vu
(74) *Attorney, Agent, or Firm*—Barnes & Thornburg LLP

(57) ABSTRACT

An apparatus for testing the phase linearity of a network comprises a first local oscillator, a first mixer, and a first filter, a second local oscillator, and a second mixer for mixing the first IF to the desired output frequency. The output of the second mixer is coupled to a second filter which passes the desired frequency band, but rejects the high frequency mixing harmonics produced in the second mixer. The output of the second filter is coupled to a variable gain amplifier capable of amplifying the frequency band of interest to the desired level and a third filter which further rejects unwanted high frequencies in the output.

86 Claims, 2 Drawing Sheets

DETERMINING PHASE LINEARITY IN CATV DISTRIBUTION SYSTEMS

CROSS-REFERENCES TO RELATED APPLICATIONS

This application is a U.S. national counterpart application of international application Ser. No. PCT/US00/25349 filed Sep. 15, 2000, which claims priority to U.S. application Ser. No. 60/154,131 filed Sep. 15, 1999.

FIELD OF THE INVENTION

This invention relates to methods and apparatus for determining phase linearity in networks. It is disclosed in the context of methods and apparatus for determining the phase linearity of CATV systems, but is believed to have applications to determining the phase linearity of other types of networks as well.

BACKGROUND OF THE INVENTION

Cable television distribution systems typically include a site called a head end where programming material is obtained and modulated onto appropriate carriers. The carriers are then combined for distribution to subscribers over what is typically referred to as the forward path. Signals coming from subscribers in a two way or "interactive" CATV system are typically routed in what is called the return path, and are received and routed to appropriate service providers. CATV signals are distributed and collected on a broadband network. CATV signals typically are transported from head end to subscriber and vice versa as RF or, in hybrid systems including optical transmission portions, RF is converted to light for fiber optic transmission over some portions of the signal path and as RF over other portions of the signal path. This process generally is bi-directional in the case of a hybrid two way CATV system. Depending on the particular architecture of the CATV plant there may exist intermediate signal processing locations.

The distribution for CATV is typically made up of conductors such as coaxial cable and optical fiber with periodic amplifiers to make up for signal loss due to a number of factors including, without limitation, imperfections in the conductors, splitting of the signal during distribution, and so on. In two-way systems, losses of the same general nature occur in the return path.

Of particular importance when transmitting signals in a CATV system is that the signals arrive at useful amplitudes. Among the other important performance criteria for a CATV system is that it not introduce excessive noise or produce distortion in the amplitude and/or phase of the signals. Methods currently exist for measuring these and other defects. For example, signal amplitude has traditionally been measured with a spectrum analyzer or calibrated tunable receiver called a signal level meter. Noise has sometimes been measured by temporarily removing a carrier and measuring the residual noise in the channel previously occupied by that carrier, or by making a noise measurement at an unoccupied frequency close to a frequency of interest.

Amplitude versus frequency distortion has sometimes been measured by inserting a moving, or swept, test carrier at one end of the system and observing it on (a) receiver(s) at various locations in the system, or by using carriers already on the system, possibly with some added carriers to provide a discrete series of frequency test measurements from which the continuous frequency response of the system can be inferred. Some television signals on CATV systems may also contain imbedded test signals called VITS (Vertical Interval Test Signals) which are added to standard TV signals during the vertical blanking interval. VITS contain bursts of several frequencies within the TV signal's bandwidth, which may be used for approximation of amplitude versus frequency response within the TV signal's occupied bandwidth.

Phase distortion within a TV signal's bandwidth can be measured using a so-called 2T pulse, which is a sine squared pulse located within the vertical interval. By demodulating the TV signal and observing the shape of the 2T pulse at various locations within the system, phase distortion can be approximated although the phase non-linearity versus frequency within the TV signal's bandwidth is not known.

At frequencies at which 2T pulses are not employed, or with non-TV signals, there is no simple method for measuring phase distortion. This application describes a convenient and simple-to-use system for measuring phase distortion in a CATV system.

DISCLOSURE OF THE INVENTION

According to one aspect of the invention, apparatus for testing the phase linearity of a network includes a first device for producing test signals spaced at known frequency intervals and with predictable phase relationships and a second device for receiving the signals, determining their phase relationships, comparing the determined phase relationships to expected phase relationships among the signals, and determining the phase linearity from the comparison, the first and second devices being adapted for coupling to the network.

Illustratively according to this aspect of the invention, the first device is capable of producing a first test signal having a first center frequency, first lower frequency spectral components, and first higher frequency spectral components, and the second device is capable of determining phase relationships for multiple spectral components of the first test signal.

Illustratively according to this aspect of the invention, the first device is capable of producing a second test signal having a second center frequency, second lower frequency spectral components, and second higher frequency spectral components, and the second device is capable of determining phase relationships for multiple spectral components of the second test signal.

Further illustratively according to this aspect of the invention, the second device is capable of comparing phase relationships among multiple frequency components of the first and second test signals to determine the phase linearity of the network.

Additionally illustratively according to this aspect of the invention, the first device includes a generator for generating at least one of a frequency modulation (FM) signal, an amplitude modulation (AM) signal and a phase modulation (PM) signal, and the second device is capable of tuning across the range of frequencies produced by the generator and processing information from the tuned frequencies.

Illustratively according to this aspect of the invention, the first device further includes a first digital signal processor (DSP).

Further illustratively according to this aspect of the invention, the first device further includes a direct digital synthesizer (DDS).

Additionally illustratively according to this aspect of the invention, the second device is capable of employing a Bessel function to perform at least one of receiving the signals, determining their phase relationships, comparing the determined phase relationships to expected phase relationships among the signals, and determining the phase linearity from the comparison.

Illustratively according to this aspect of the invention, the second device includes a table containing values of the Bessel function for use in evaluating the Bessel function.

Further illustratively according to this aspect of the invention, the first device includes a first local oscillator, a first mixer, and a first filter.

Additionally illustratively according to this aspect of the invention, the second device includes a second mixer for mixing the received test signal, and a second filter coupled to the second mixer.

Illustratively according to this aspect of the invention, the second filter includes a bandpass filter having a center frequency substantially equal to the output of the generator and a sufficiently narrow bandwidth to reject frequencies lower than the lower frequency components and higher than the higher frequency components.

Further illustratively according to this aspect of the invention, the second device further includes a digital signal processor (DSP) capable of fast Fourier transforming (FFT-ing) a signal related to the output of the second filter to produce a signal related to the determined phase relationship.

Additionally illustratively according to this aspect of the invention, the second device further includes a user interface for displaying an output related to the determined phase relationship.

Illustratively according to this aspect of the invention, at least one of the first and second devices includes a device for producing a signal for synchronizing the transmission by the first device and reception by the second device of the test signals.

Further illustratively according to this aspect of the invention, the first and second devices include information concerning the test frequencies, the synchronizing signals causing the first and second devices to transmit and receive multiple test frequencies in an established sequence.

Additionally illustratively according to this aspect of the invention, the said one of the first and second devices includes a device for transmitting the synchronizing signal on the network.

Illustratively according to this aspect of the invention, at least one of the first and second devices is further adapted for transmitting information related to the determined phase relationships through the network to at least the other of the first and second devices.

Further illustratively according to this aspect of the invention, the at least one of the first and second devices adapted for transmitting information related to the determined phase relationships through the network is adapted for transmitting the information through a network channel dedicated to the transmission of the information.

Additionally illustratively according to this aspect of the invention, the at least one of the first and second devices adapted for transmitting the information through a network channel dedicated to the transmission of the information includes a device adapted for transmitting the information by frequency shift keying (FSK).

Illustratively according to this aspect of the invention, at least one of the first and second devices is further adapted for producing a signal for synchronizing the transmission by the first device and reception by the second device of the test signals, the information related to the determined phase relationships being transmitted in the same channel as the synchronizing signal.

Further illustratively according to this aspect of the invention, at least one of the first and second devices is further adapted for determining the amplitudes of the received test signals.

Additionally illustratively according to this aspect of the invention, the at least one of the first and second devices adapted for determining the amplitudes of the received test signals is further adapted for comparing the amplitudes of the received test signals to each other to determine variation of the amplitude of the frequency response characteristic across the frequencies contained in the test signals.

Illustratively according to this aspect of the invention, the at least one of the first and second devices adapted for determining the amplitudes of the received test signals is further adapted for comparing the amplitudes of the received test signals to the amplitudes of the transmitted test signals.

Further illustratively according to this aspect of the invention, the other of the at least one of the first and second devices is further adapted for transmitting an indication of the amplitudes of the transmitted test signals.

According to another aspect of the invention, a method for testing the phase linearity of a network, the method including producing on the network test signals spaced at known frequency intervals and with predictable phase relationships, receiving the signals from the network, determining their phase relationships, comparing the determined phase relationships to expected phase relationships among the signals, and determining from the comparison the phase linearity of the network.

Illustratively according to this aspect of the invention, producing test signals spaced at known frequency intervals and with predictable phase relationships includes producing a first test signal having a first center frequency, first lower frequency spectral components, and first higher frequency spectral components, and determining the phase relationships of the test signals includes determining phase relationships for multiple spectral components of the first test signal.

Illustratively according to this aspect of the invention, producing test signals spaced at known frequency intervals and with predictable phase relationships includes producing a second test signal having a second center frequency, second lower frequency spectral components, and second higher frequency spectral components, and receiving the signals from the network, determining their phase relationships, comparing the determined phase relationships to expected phase relationships among the signals, and determining from the comparison the phase linearity of the network includes determining phase relationships for multiple spectral components of the second test signal.

Further illustratively according to this aspect of the invention, determining the phase relationships of the test signals, comparing the determined phase relationships to expected phase relationships among the test signals, and determining from the comparison the phase linearity of the network include comparing the phase relationships among multiple frequency components of the first and second test signals to determine the phase linearity of the network.

Additionally illustratively according to the present invention, producing on the network test signals spaced at known frequency intervals and with predictable phase relationships includes generating a test signal, and receiving the signals from the network, determining their phase relationships, comparing the determined phase relationships to expected phase relationships among the signals, and determining from the comparison the phase linearity of the network include tuning across the test signal frequency range and processing information from the tuned frequencies.

Illustratively according to this aspect of the invention, producing on the network test signals spaced at known frequency intervals and with predictable phase relationships includes producing with a first digital signal processor (DSP) test signals spaced at known frequency intervals and with predictable phase relationships on the network.

Further illustratively according to this aspect of the invention, producing on the network test signals spaced at known frequency intervals and with predictable phase relationships includes producing with a direct digital synthesizer (DDS) test signals spaced at known frequency intervals and with predictable phase relationships on the network.

Additionally illustratively according to this aspect of the invention, receiving the signals from the network, determining their phase relationships, comparing the determined phase relationships to expected phase relationships among the signals, and determining from the comparison the phase linearity of the network include employing a Bessel function to perform at least one of receiving the signals, determining their phase relationships, comparing the determined phase relationships to expected phase relationships among the signals, and determining the phase linearity from the comparison.

Illustratively according to this aspect of the invention, employing a Bessel function to perform at least one of receiving the signals, determining their phase relationships, comparing the determined phase relationships to expected phase relationships among the signals, and determining the phase linearity from the comparison includes employing a table containing values of the Bessel function for use in evaluating the Bessel function to perform at least one of receiving the signals, determining their phase relationships, comparing the determined phase relationships to expected phase relationships among the signals, and determining the phase linearity from the comparison.

Further illustratively according to this aspect of the invention, producing on the network test signals spaced at known frequency intervals and with predictable phase relationships includes providing a first local oscillator, a first mixer coupled to receive an output of the first local oscillator, and a first filter coupled to receive an output of the first mixer.

Additionally illustratively according to this aspect of the invention, receiving the signals from the network, determining their phase relationships, comparing the determined phase relationships to expected phase relationships among the signals, and determining from the comparison the phase linearity of the network include providing a second mixer for mixing the received test signal with an output from a second local oscillator, and a second filter coupled to receive an output from the second mixer.

Illustratively according to this aspect of the invention, providing a second filter includes providing a bandpass filter having a center frequency substantially equal to a center frequency of the test signal and a sufficiently narrow bandwidth to reject frequencies lower than the lower frequency components and higher than the higher frequency components.

Further illustratively according to this aspect of the invention, receiving the signals from the network, determining their phase relationships, comparing the determined phase relationships to expected phase relationships among the signals, and determining from the comparison the phase linearity of the network include providing a digital signal processor (DSP) capable of fast Fourier transforming (FFTing) a signal related to the output of the second filter to produce a signal related to the determined phase relationship.

Additionally illustratively according to this aspect of the invention, receiving the signals from the network, determining their phase relationships, comparing the determined phase relationships to expected phase relationships among the signals, and determining from the comparison the phase linearity of the network include providing a user interface for displaying an output related to the determined phase relationship.

Illustratively according to this aspect of the invention, the method further includes producing with one of the first and second devices a signal for synchronizing the transmission by the first device and reception by the second device of the test signals.

Further illustratively according to this aspect of the invention, the method includes providing in the first and second devices information concerning the test frequencies to cause the first and second devices to transmit and receive multiple test frequencies in an established sequence.

Additionally illustratively according to this aspect of the invention, the method includes transmitting the synchronizing signal on the network.

Further illustratively according to this aspect of the invention, the method includes transmitting information related to the determined phase relationships through the network from one of the first and second devices to the other of the first and second devices.

Illustratively according to this aspect of the invention, transmitting information related to the determined phase relationships through the network from one of the first and second devices to the other of the first and second devices includes transmitting the information through a network channel dedicated to the transmission of the information.

Additionally illustratively according to this aspect of the invention, transmitting the information through a network channel dedicated to the transmission of the information includes transmitting the information by frequency shift keying (FSK).

Further illustratively according to this aspect of the invention, the method includes producing with one of the first and second devices a signal for synchronizing the transmission by the first device and reception by the second device of the test signals, transmitting information related to the determined phase relationships through the network including transmitting the information related to the determined phase relationships in the same channel as the synchronizing signal.

Further illustratively according to this aspect of the invention, the method includes determining the amplitudes of the received test signals.

Further illustratively according to this aspect of the invention, the method includes comparing the amplitudes of the received test signals to each other to determine variation of the amplitude of the frequency response characteristic across the frequencies contained in the test signals.

Further illustratively according to this aspect of the invention, the method includes comparing the amplitudes of the received test signals to the amplitudes of the transmitted test signals.

Further illustratively according to this aspect of the invention, the method includes transmitting an indication of the amplitudes of the transmitted test signals.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

A system constructed according to the present invention includes two elements. The first element includes a signal source capable of being modulated in amplitude, frequency, phase, or some combination of amplitude, frequency and phase that produces a signal with spectral elements spaced at known frequency intervals and with predictable phase relationships. The second element includes a receiving device that can receive the just described signal and determine the phase relationships of its various spectral elements. The phase relationships can then be compared to the expected relationships and the phase distortion determined.

By suitable placement of the test signal's spectral elements, several points within its bandwidth can be obtained. The method can be extended to wider bandwidths by setting the test signal to a center frequency so that the lowest frequency spectral element of the test signal is placed at or near the lowest desired measurement frequency, and noting the phase relationships for each spectral element of the test signal. The test signal can then be moved to a second center frequency such that one or more of the highest spectral elements for the first carrier frequency will be at or near one or more of the lower frequency spectral elements of the second test carrier frequency. Because the phase distortion should be equal for the spectral elements of the first and second test signals which occurred at or near the same frequency, the phase distortion over the combined frequency range can be found. This method may be extended to cover any desired measurement bandwidth by using additional test signal center frequencies as described.

One possible means of implementing the invention is to use a single tone FM generator as the transmitter, and a receiver capable of tuning to the test signal and processing the incoming data. Single tone FM is generated from the following equation:

$$\text{Single Tone FM} = A_c^* \cos\{2^*\pi^*F_c^*t + \beta^* \sin(2^*\pi^*F_m^*t)\}$$

Where:

$A_c$ is the amplitude of the test signal;

$F_c$ is the center frequency, or carrier frequency, of the test signal;

$\beta$ is the modulation index; and, $F_m$ is the modulation frequency.

Figure 1:
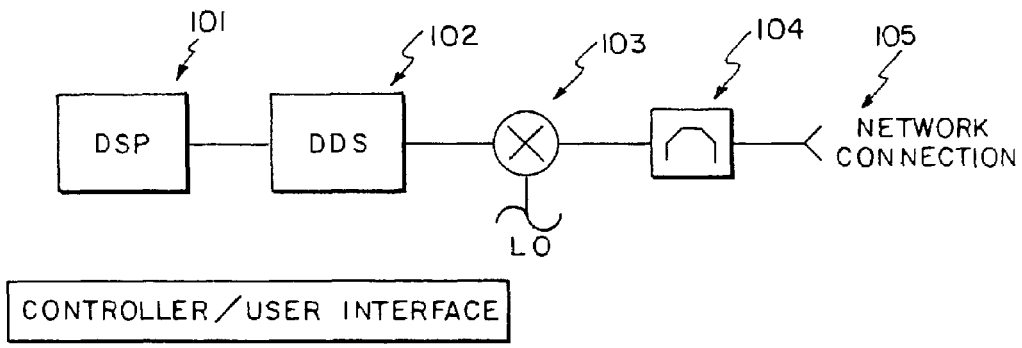
FIG. 1 illustrates an embodiment of a component of a system according to the present invention.

FIG. 1 illustrates a transmitter that is capable of producing single tone FM. A digital signal processor (DSP) 101 generates the test signal in digital form and transmits the digital data to a direct digital synthesizer (DDS) 102. The DDS 102 produces a single tone FM signal whose sidebands' amplitudes and phases have predictable relationships with the carrier. The frequency response of a system to single tone FM can be predicted from the Bessel function of the first kind of order n and argument $\beta$. The Bessel function cannot be evaluated in closed form. However, many tables can be found that document its properties. See, for example, Ziemer and Tranter, PRINCIPLES OF COMMUNICATIONS, p. 117, which is hereby incorporated herein by reference.

The DDS 102 produces a test signal centered around some intermediate frequency (IF), for example, 20 MHZ. A local oscillator 103 is used to mix the IF signal to a desired output frequency between, for example, 5 MHZ and 1000 MHZ. A bandpass filter 104 filters out the undesired harmonics produced by the mixing process. The RF output 105 is coupled to the channel whose phase distortion characteristics are of interest. The first device can be controlled by a controller, which is typically microprocessor- or microcomputer-based, and can also include additional user interface, such as a keypad, a display, and the like.

Figure 2:
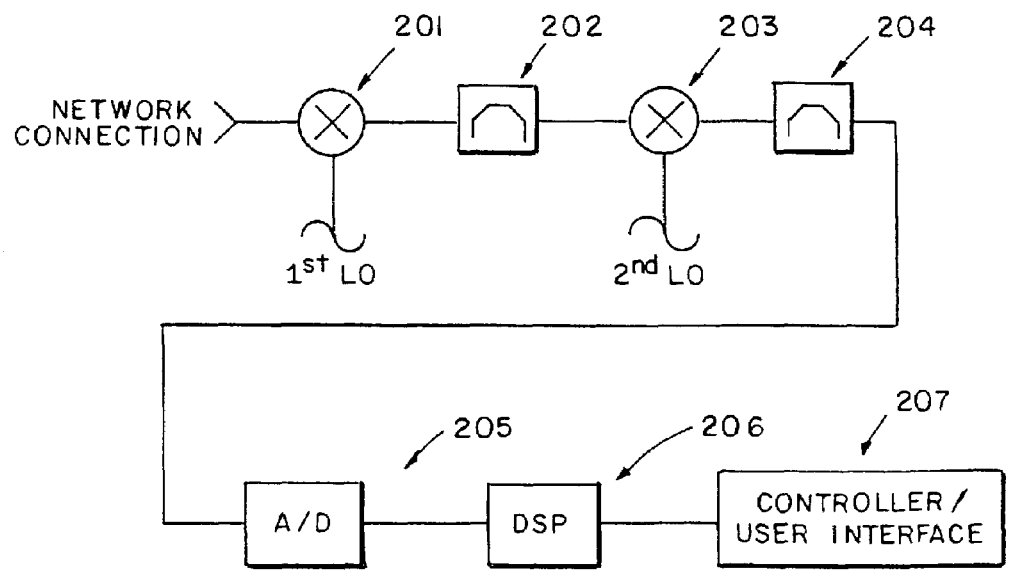
FIG. 2 illustrates an embodiment of another component of a system according to the present invention.

A receiver according to the invention is illustrated in FIG. 2. The RF input frequency can vary from, for example, 5 MHZ to 1000 MHZ. A first mixer 201 mixes the input signal to the first IF. This signal is filtered by a bandpass filter 202, which has a bandwidth wide enough to pass the single tone FM information, and narrow enough to reject the unwanted images created by the first mixer 201. A second mixer 203 mixes the input first IF down to a second IF, which frequency an A/D converter 205 is capable of sampling either directly or as an aliased version of itself. A bandpass filter 204 filters the input signal to a bandwidth that is less than the A/D converter's sampling frequency Fs divided by 2 (that is, <Fs/2). The A/D converter 205 converts the input signal at the second IF to digital words and passes these digital words to a DSP 206. DSP 206 performs an N point fast Fourier transform (FFT), where N is chosen such that Fs/N<separation of the sidebands in the single tone FM signal. It is also helpful if the single tone FM modulation index ($\beta$), modulation frequency ($F_m$), and center frequency ($F_c$) are chosen such that the frequencies of interest fall on the centers of the DSP 206's FFT bins. The FFT bin centers appear at multiples of Fs/N between DC and Fs/2. The output from the FFT is in complex form and the phase of each bin is calculated by the equation:

$$\tan^{-1}(\text{imaginary part of(FFTbin}(n))/\text{real part of(FFT-bin}(n))), \text{ where } n = 0, 1, \ldots, N/2-1.$$

The DSP 206 needs prior knowledge of what FFT bins the single tone FM sidebands of interest reside in. Using this knowledge the DSP 206 can compare the measured phase difference between the single tone FM sidebands of interest and compare the measurements with the ideal phase difference. Any discrepancies will be provided to a user interface 207 as phase distortion. As was the case with the first device, the second device can be controlled by a controller, which is typically microprocessor- or microcomputer-based, and can also include additional user interface, such as a keypad, a display, and the like.

One of the instruments illustrated in FIGS. 1 and 2 can control the other. Illustratively the control can be effected through the network itself. In the case of a CATV system, a designated forward or return channel can carry the control signals. In such a situation, control can be initiated by either instrument. For example, the transmitter of FIG. 1 can generate control signals in the forward, or downstream, channel, to synchronize the operation of the transmitter and the receiver of FIG. 2. This can be done using, for example, a table stored in each of the transmitter and receiver, and clocks in both to synchronize their stepping through a sequence of test frequencies. As another alternative, the synchronizing signal can be generated by the receiver illustrated in FIG. 2, indicating that the receiver is ready to initiate the testing protocol.

As another example, the operation of the transmitter illustrated in FIG. 1 and the receiver illustrated in FIG. 2 can be controlled by one or the other of the transmitter and the receiver sending commands through the network indicating to what frequency the other of the transmitter and receiver should next tune to transmit or to receive test signals. In addition, it should be recognized that the functions described for one or the other or both the transmitter and the receiver can be incorporated into instruments which perform one or more additional measurements or other functions, including, but not limited to, signal level measurements, leakage measurements, digital signal measurements and impairments, and so on.

It should further be recognized that when the forward path is being tested for phase linearity, the transmitter illustrated in FIG. 1 will typically be stationary in the headend or at a hub, and the receiver illustrated in FIG. 2 will typically be transported around the network, for example, by a technician. However, when the return path is being tested for linearity, the reverse will typically be the case. That is, the receiver illustrated in FIG. 2 will typically be stationary in the headend or at a hub and the transmitter illustrated in FIG. 1 typically will be transported around the network In at least this latter situation, it will frequently be desirable to transmit either raw data or calculated phase shifts or some other index of the parameter being investigated back to the transmitter. Therefore, it is desirable to incorporate into either one or both of the transmitter and receiver the ability to transmit raw phase shift data, calculated phase shifts or some other index of measured phase shift performance of the network to the other of the transmitter and receiver. This may be accomplished simply by using the same facility which is used to generate and transmit the synchronizing pulses to transmit the data.

In another example, frequency shift keying can be used to transmit the data. This method is similar to that used for data transmission in, for example, the model 9580 SST and 9580 SSR, both of which are available from Trilithic, Inc., 9202 East 33$^{rd}$ Street, Indianapolis, Ind. 46236. The construction and operation of the 9580 SST and 9580 SSR are hereby incorporated herein by reference. The transmission can take place in any desired location(s) in the forward and/or return path(s). For example, if FSK is used for data transmission, (a) proprietary channel(s) can be set aside for data transmission. Alternatively, one of the existing, otherwise unused forward and/or return channels can be employed for data transmission. It should further be recognized that in a system in which both the transmitter and receiver are equipped with, for example, DSPs and DDSs capable of measuring phase relationships, that it is not necessary to control carefully the transmitted test signal. If the transmitter is capable of determining phase relationships, it can determine the phase relationships of the test signals it is transmitting and transmit this phase information, either as raw data, or as calculated phase shifts, or the like, to the receiver as a separate data packet for use by the receiver in calculating the network's phase shifts. It should also be noted that the amplitude of a channel's frequency response can be determined basically at the same time, simply by knowing or having data transmitted to indicate the amplitude of the transmitted test signal, and the variation of the amplitude of the frequency response can be determined relatively, even without knowing the amplitudes of the transmitted test signals.

Figure 3:
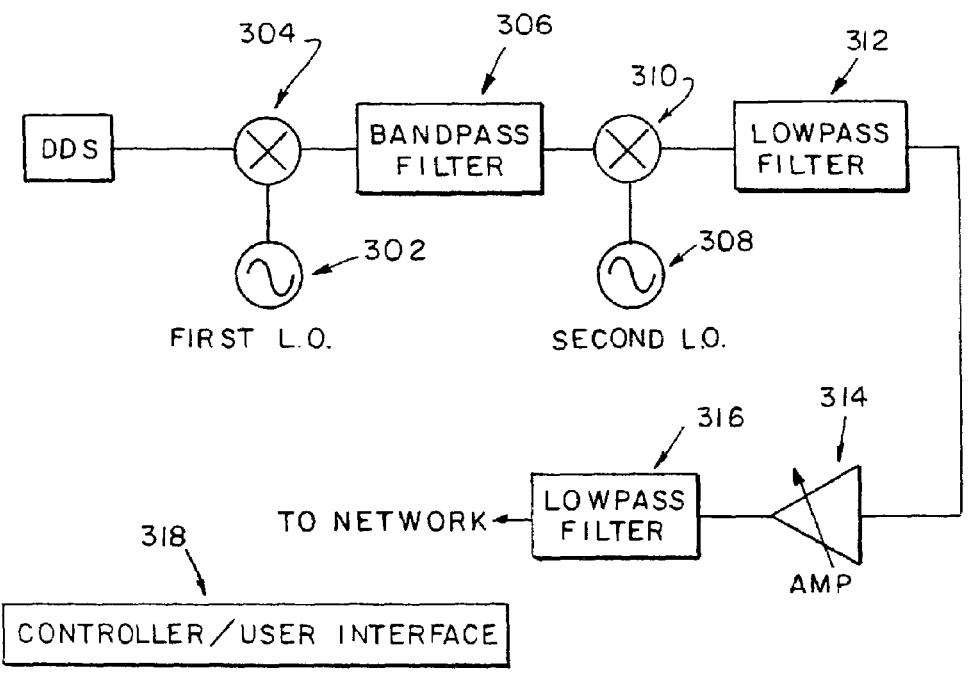
FIG. 3 illustrates another embodiment of a component of a system according to the present invention; and, FIG. 4 illustrates another embodiment of a component of a system according to the present invention.

In another embodiment of the first device illustrated in FIG. 3, the first device includes a first local oscillator 302, a first mixer 304, and a first filter 306 having a center frequency higher than the highest frequency to transmitted, a second local oscillator 308, and a second mixer 310 for mixing the first IF to the desired output frequency. The output of the second mixer 310 is coupled to a second filter 312 which passes the desired frequency band, but rejects the high frequency mixing harmonics produced in the second mixer 310. The output of the second filter 312 is coupled to a variable gain amplifier 314 capable of amplifying the frequency band of interest to the desired level and a third filter 316 which further rejects unwanted high frequencies in the output. The first device also includes a user interface 318, which again typically includes a microprocessor- or microcomputer-based controller used to control the operation of device, as well as a keypad, a display, and the like.

Figure 4:
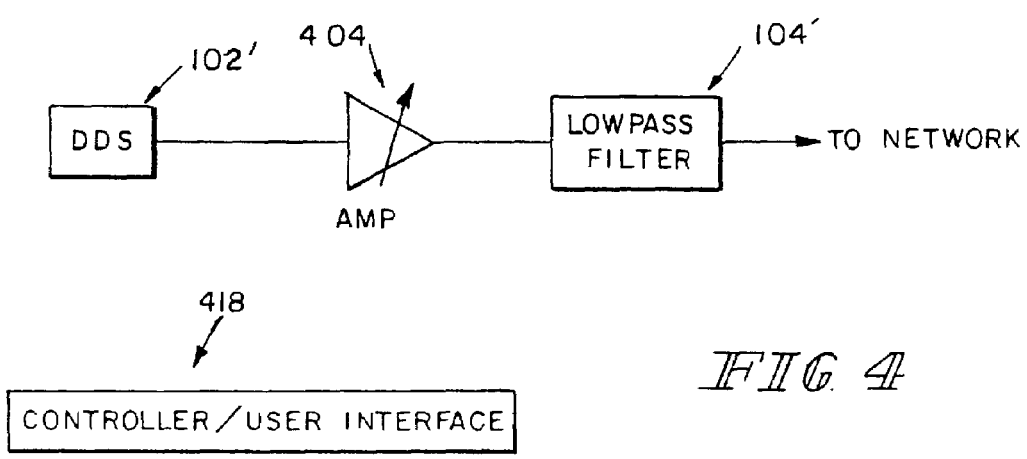

Referring now to FIGS. 1 and 4, in cases in which the frequency band of interest lies within the capabilities of the DDS 102 illustrated in FIG. 1, the first device may be simplified. Specifically, and with reference to FIG. 4, the first device can include a DDS 102' coupled to a variable gain amplifier 404 capable of amplifying the frequency band of interest to the desired level, and a first filter 104' having a cutoff frequency higher than the highest frequency to be transmitted. Again as with the previous embodiments of both the transmitter and the receiver, the first device can be controlled by a controller 418, which is typically microprocessor- or microcomputer-based, and can also include additional user interface, such as a keypad, a display, and the like.

The invention claimed is:

1. Apparatus for testing the phase linearity of a network, the apparatus including a first device for producing test signals spaced at known frequency intervals and with predictable phase relationships and a second device for receiving the signals, determining their phase relationships, comparing the determined phase relationships to expected phase relationships among the signals, and determining the phase linearity from the comparison, the first and second devices being adapted for coupling to the network, at least one of the first and second devices being further adapted for determining the amplitudes of the received test signals and for comparing the amplitudes of the received test signals to each other to determine variation of the amplitude of the frequency response characteristic across the frequencies contained in the test signals.

2. The apparatus of claim 1 wherein the first device is capable of producing a first test signal having a first center frequency, first lower frequency spectral components, and first higher frequency spectral components, and the second device is capable of determining phase relationships for multiple spectral components of the first test signal.

3. The apparatus of claim 2 wherein the first device is capable of producing a second test signal having a second center frequency, second lower frequency spectral components, and second higher frequency spectral components, and the second device being capable of determining phase relationships for multiple spectral components of the second test signal.

4. The apparatus of claim 3 wherein the second device is capable of comparing phase relationships among multiple frequency components of the first and second test signals to determine the phase linearity of the network.

5. The apparatus of claim 1 wherein the first device includes a generator for generating at least one of a frequency modulation (FM) signal, an amplitude modulation (AM) signal and a phase modulation (PM) signal, and the second device is capable of tuning across a range of frequencies produced by the generator and processing information from the tuned frequencies.

6. The apparatus of claim 1 wherein the first device includes a digital signal processor (DSP).

7. The apparatus of claim 1 wherein the first device includes a direct digital synthesizer (DDS).

8. The apparatus of claim 1 wherein the first device includes a local oscillator, a mixer coupled to receive an output of the local oscillator, and a filter coupled to receive an output of the mixer.

9. The apparatus of claim 1 wherein the second device includes a mixer for mixing the received test signal, and a filter coupled to the mixer.

10. The apparatus of claim 9 wherein the second device further includes a digital signal processor (DSP) capable of fast Fourier transforming (FFTing) a signal related to the output of the filter to produce a signal related to the determined phase relationship.

11. The apparatus of claim 9 wherein the filter includes a bandpass filter having a center frequency substantially equal to a center frequency of the test signals and a sufficiently narrow bandwidth to reject frequencies lower than lower frequency components of the test signals and higher than higher frequency components of the test signals.

12. The apparatus of claim 1 wherein the second device is capable of employing a Bessel function to perform at least one of receiving the signals, determining their phase relationships, comparing the determined phase relationships to expected phase relationships among the signals, and determining the phase linearity from the comparison.

13. The apparatus of claim 12 wherein the second device includes a table containing values of the Bessel function for use in evaluating the Bessel function.

14. The apparatus of claim 1 wherein at least one of the first and second devices includes a device for producing a signal for synchronizing the transmission by the first device and reception by the second device of the test signals.

15. The apparatus of claim 14 wherein the first and second devices include information concerning the test frequencies, the synchronizing signals causing the first and second devices to transmit and receive multiple test frequencies in an established sequence.

16. The apparatus of claim 14 wherein said one of the first and second devices includes a device for transmitting the synchronizing signal on the network.

17. The apparatus of claim 1 wherein at least one of the first and second devices is further adapted for transmitting information related to the determined phase relationships through the network to at least the other of the first and second devices.

18. The apparatus of claim 17 wherein the at least one of the first and second devices adapted for transmitting information related to the determined phase relationships through the network is adapted for transmitting the information through a network channel dedicated to the transmission of the information.

19. The apparatus of claim 18 wherein the at least one of the first and second devices adapted for transmitting the information through a network channel dedicated to the transmission of the information includes a device adapted for transmitting the information by frequency shift keying (FSK).

20. The apparatus of claim 17 wherein at least one of the first and second devices is further adapted for producing a signal for synchronizing the transmission by the first device and reception by the second device of the test signals, the information related to the determined phase relationships being transmitted in the same channel as the synchronizing signal.

21. The apparatus of claim 1 wherein the second device further includes a user interface for displaying an output related to the determined phase relationship.

22. Apparatus for testing the phase linearity of a network, the apparatus including a first device for producing test signals spaced at known frequency intervals and with predictable phase relationships and a second device for receiving the signals, determining their phase relationships, comparing the determined phase relationships to expected phase relationships among the signals, and determining the phase linearity from the comparison, the first and second devices being adapted for coupling to the network, at least one of the first and second devices being further adapted for determining the amplitudes of the received test signals, the at least one of the first and second devices adapted for determining the amplitudes of the received test signals is being further adapted for comparing the amplitudes of the received test signals to the amplitudes of the transmitted test signals.

23. The apparatus of claim 22 wherein the other of the at least one of the first and second devices is further adapted for transmitting an indication of the amplitudes of the transmitted test signals.

24. The apparatus of claim 22 wherein the first device is capable of producing a first test signal having a first center frequency, first lower frequency spectral components, and first higher frequency spectral components, and the second device is capable of determining phase relationships for multiple spectral components of the first test signal.

25. The apparatus of claim 24 wherein the first device is capable of producing a second test signal having a second center frequency, second lower frequency spectral components, and second higher frequency spectral components, and the second device being capable of determining phase relationships for multiple spectral components of the second test signal.

26. The apparatus of claim 25 wherein the second device is capable of comparing phase relationships among multiple frequency components of the first and second test signals to determine the phase linearity of the network.

27. The apparatus of claim 22 wherein the first device includes a generator for generating at least one of a frequency modulation (FM) signal, an amplitude modulation (AM) signal and a phase modulation (PM) signal, and the second device is capable of tuning across a range of frequencies produced by the generator and processing information from the tuned frequencies.

28. The apparatus of claim 22 wherein the first device includes a digital signal processor (DSP).

29. The apparatus of claim 22 wherein the first device includes a direct digital synthesizer (DDS).

30. The apparatus of claim 22 wherein the first device includes a local oscillator, a mixer coupled to receive an output of the local oscillator, and a filter coupled to receive an output of the mixer.

31. The apparatus of claim 22 wherein the second device includes a mixer for mixing the received test signal, and a filter coupled to the mixer.

32. The apparatus of claim 31 wherein the second device further includes a digital signal processor (DSP) capable of fast Fourier transforming (FFTing) a signal related to the output of the filter to produce a signal related to the determined phase relationship.

33. The apparatus of claim 31 wherein the filter includes a bandpass filter having a center frequency substantially equal to a center frequency of the test signals and a sufficiently narrow bandwidth to reject frequencies lower than lower frequency components of the test signals and higher than higher frequency components of the test signals.

34. The apparatus of claim 22 wherein the second device is capable of employing a Bessel function to perform at least one of receiving the signals, determining their phase relationships, comparing the determined phase relationships to expected phase relationships among the signals, and determining the phase linearity from the comparison.

35. The apparatus of claim 34 wherein the second device includes a table containing values of the Bessel function for use in evaluating the Bessel function.

36. The apparatus of claim 22 wherein at least one of the first and second devices includes a device for producing a signal for synchronizing the transmission by the first device and reception by the second device of the test signals.

37. The apparatus of claim 36 wherein the first and second devices include information concerning the test frequencies, the synchronizing signals causing the first and second devices to transmit and receive multiple test frequencies in an established sequence.

38. The apparatus of claim 36 wherein said one of the first and second devices includes a device for transmitting the synchronizing signal on the network.

39. The apparatus of claim 22 wherein at least one of the first and second devices is further adapted for transmitting information related to the determined phase relationships through the network to at least the other of the first and second devices.

40. The apparatus of claim 39 wherein the at least one of the first and second devices adapted for transmitting information related to the determined phase relationships through the network is adapted for transmitting the information through a network channel dedicated to the transmission of the information.

41. The apparatus of claim 40 wherein the at least one of the first and second devices adapted for transmitting the information through a network channel dedicated to the transmission of the information includes a device adapted for transmitting the information by frequency shift keying (FSK).

42. The apparatus of claim 39 wherein at least one of the first and second devices is further adapted for producing a signal for synchronizing the transmission by the first device and reception by the second device of the test signals, the information related to the determined phase relationships being transmitted in the same channel as the synchronizing signal.

43. The apparatus of claim 22 wherein the second device further includes a user interface for displaying an output related to the determined phase relationship.

44. A method for testing the phase linearity of a network, the method including producing on the network test signals spaced at known frequency intervals and with predictable phase relationships, receiving the signals from the network, determining their phase relationships, comparing the determined phase relationships to expected phase relationships among the signals, determining from the comparison the phase linearity of the network, determining the amplitudes of the received test signals, and comparing the amplitudes of the received test signals to each other to determine variation of the amplitude of the frequency response characteristic across the frequencies contained in the test signals.

45. The method of claim 44 wherein producing on the network test signals spaced at known frequency intervals and with predictable phase relationships includes producing a first test signal having a first center frequency, first lower frequency spectral components, and first higher frequency spectral components, and receiving the signals from the network, determining their phase relationships, comparing the determined phase relationships to expected phase relationships among the signals, and determining from the comparison the phase linearity of the network includes determining phase relationships for multiple spectral components of the first test signal.

46. The method of claim 45 wherein producing on the network test signals spaced at known frequency intervals and with predictable phase relationships includes producing a second test signal having a second center frequency, second lower frequency spectral components, and second higher frequency spectral components, and receiving the signals from the network, determining their phase relationships, comparing the determined phase relationships to expected phase relationships among the signals, and determining from the comparison the phase linearity of the network includes determining phase relationships for multiple spectral components of the second test signal.

47. The apparatus of claim 46 wherein the second device is capable of comparing phase relationships among multiple frequency components of the first and second test signals to determine the phase linearity of the network.

48. The method of claim 44 wherein producing on the network test signals spaced at known frequency intervals and with predictable phase relationships includes generating at least one of a frequency modulation (FM) signal, an amplitude modulation (AM) signal and a phase modulation (PM) signal, and receiving the signals from the network, determining their phase relationships, comparing the determined phase relationships to expected phase relationships among the signals, and determining from the comparison the phase linearity of the network include tuning across a range of frequencies and processing information from the tuned frequencies.

49. The method of claim 44 wherein producing on the network test signals spaced at known frequency intervals and with predictable phase relationships includes producing on the network with a digital signal processor (DSP) test signals spaced at known frequency intervals and with predictable phase relationships.

50. The method of claim 44 wherein producing on the network test signals spaced at known frequency intervals and with predictable phase relationships includes producing on the network with a direct digital synthesizer (DDS) test signals spaced at known frequency intervals and with predictable phase relationships.

51. The method of claim 44 wherein producing on the network test signals spaced at known frequency intervals and with predictable phase relationships includes producing on the network using a local oscillator, a mixer coupled to receive an output of the local oscillator, and a filter coupled to receive an output of the mixer test signals spaced at known frequency intervals and with predictable phase relationships.

52. The method of claim 44 wherein receiving the signals from the network, determining their phase relationships, comparing the determined phase relationships to expected phase relationships among the signals, and determining from the comparison the phase linearity of the network includes receiving the signals from the network, determining their phase relationships, comparing the determined phase relationships to expected phase relationships among the signals, and determining from the comparison the phase linearity of the network using a mixer for mixing the received test signal, and a filter coupled to the mixer.

53. The method of claim 52 wherein receiving the signals from the network, determining their phase relationships, comparing the determined phase relationships to expected phase relationships among the signals, and determining from the comparison the phase linearity of the network includes receiving the signals from the network, determining their phase relationships, comparing the determined phase relationships to expected phase relationships among the signals, and determining from the comparison the phase linearity of the network using a digital signal processor (DSP) capable of fast Fourier transforming (FFTing) a signal related to the output of the second filter to produce a signal related to the determined phase relationship.

54. The method of claim 52 wherein using a filter includes using a bandpass filter having a center frequency substantially equal to a center frequency of the test signals and a sufficiently narrow bandwidth to reject frequencies lower than lower frequency components of the test signals and higher than higher frequency components of the test signals.

55. The method of claim 44 wherein receiving the signals from the network, determining their phase relationships, comparing the determined phase relationships to expected phase relationships among the signals, and determining from the comparison the phase linearity of the network includes employing a Bessel function to perform at least one of receiving the signals, determining their phase relationships, comparing the determined phase relationships to expected phase relationships among the signals, and determining the phase linearity from the comparison.

56. The method of claim 55 wherein employing a Bessel function includes employing a table containing values of the Bessel function for use in evaluating the Bessel function.

57. The method of claim 44 further including producing with one of the first and second devices a signal for synchronizing the transmission by the first device and reception by the second device of the test signals.

58. The method of claim 57 further including providing in the first and second devices information concerning the test frequencies to cause the first and second devices to transmit and receive multiple test frequencies in an established sequence.

59. The method of claim 57 including transmitting the synchronizing signal on the network.

60. The method of claim 44 further including transmitting information related to the determined phase relationships through the network from one of the first and second devices to the other of the first and second devices.

61. The method of claim 60 wherein transmitting information related to the determined phase relationships through the network from one of the first and second devices to the other of the first and second devices includes transmitting the information through a network channel dedicated to the transmission of the information.

62. The method of claim 61 wherein transmitting the information through a network channel dedicated to the transmission of the information includes transmitting the information by frequency shift keying (FSK).

63. The method of claim 60 further including producing with one of the first and second devices a signal for synchronizing the transmission by the first device and reception by the second device of the test signals, transmitting information related to the determined phase relationships through the network including transmitting the information related to the determined phase relationships in the same channel as the synchronizing signal.

64. The method of claim 44 further including displaying an output related to the determined phase relationship.

65. A method for testing the phase linearity of a network, the method including producing on the network test signals spaced at known frequency intervals and with predictable phase relationships, receiving the signals from the network, determining their phase relationships, comparing the determined phase relationships to expected phase relationships among the signals, determining from the comparison the phase linearity of the network, determining the amplitudes of the received test signals, and comparing the amplitudes of the received test signals to the amplitudes of the transmitted test signals.

66. The method of claim 65 further including transmitting an indication of the amplitudes of the transmitted test signals.

67. The method of claim 65 wherein producing on the network test signals spaced at known frequency intervals and with predictable phase relationships includes producing a first test signal having a first center frequency, first lower frequency spectral components, and first higher frequency spectral components, and receiving the signals from the network, determining their phase relationships, comparing the determined phase relationships to expected phase relationships among the signals, and determining from the comparison the phase linearity of the network includes determining phase relationships for multiple spectral components of the first test signal.

68. The method of claim 67 wherein producing on the network test signals spaced at known frequency intervals and with predictable phase relationships includes producing a second test signal having a second center frequency, second lower frequency spectral components, and second higher frequency spectral components, and receiving the signals from the network, determining their phase relationships, comparing the determined phase relationships to expected phase relationships among the signals, and determining from the comparison the phase linearity of the network includes determining phase relationships for multiple spectral components of the second test signal.

69. The apparatus of claim 68 wherein the second device is capable of comparing phase relationships among multiple frequency components of the first and second test signals to determine the phase linearity of the network.

70. The method of claim 65 wherein producing on the network test signals spaced at known frequency intervals and with predictable phase relationships includes generating at least one of a frequency modulation (FM) signal, an amplitude modulation (AM) signal and a phase modulation (PM) signal, and receiving the signals from the network, determining their phase relationships, comparing the determined phase relationships to expected phase relationships among the signals, and determining from the comparison the phase linearity of the network include tuning across a range of frequencies and processing information from the tuned frequencies.

71. The method of claim 65 wherein producing on the network test signals spaced at known frequency intervals and with predictable phase relationships includes producing on the network with a digital signal processor (DSP) test signals spaced at known frequency intervals and with predictable phase relationships.

72. The method of claim 65 wherein producing on the network test signals spaced at known frequency intervals and with predictable phase relationships includes producing on the network with a direct digital synthesizer (DDS) test signals spaced at known frequency intervals and with predictable phase relationships.

73. The method of claim 65 wherein producing on the network test signals spaced at known frequency intervals and with predictable phase relationships includes producing on the network using a local oscillator, a mixer coupled to receive an output of the local oscillator, and a filter coupled to receive an output of the mixer test signals spaced at known frequency intervals and with predictable phase relationships.

74. The method of claim 65 wherein receiving the signals from the network, determining their phase relationships, comparing the determined phase relationships to expected phase relationships among the signals, and determining from the comparison the phase linearity of the network includes receiving the signals from the network, determining their phase relationships, comparing the determined phase relationships to expected phase relationships among the signals, and determining from the comparison the phase linearity of the network using a mixer for mixing the received test signal, and a filter coupled to the mixer.

75. The method of claim 74 wherein receiving the signals from the network, determining their phase relationships, comparing the determined phase relationships to expected phase relationships among the signals, and determining from the comparison the phase linearity of the network includes receiving the signals from the network, determining their phase relationships, comparing the determined phase relationships to expected phase relationships among the signals, and determining from the comparison the phase linearity of the network using a digital signal processor (DSP) capable of fast Fourier transforming (FFTing) a signal related to the output of the filter to produce a signal related to the determined phase relationship.

76. The method of claim 74 wherein using a filter includes using a bandpass filter having a center frequency substantially equal to a center frequency of the test signals and a sufficiently narrow bandwidth to reject frequencies lower than lower frequency components of the test signals and higher than higher frequency components of the test signals.

77. The method of claim 65 wherein receiving the signals from the network, determining their phase relationships, comparing the determined phase relationships to expected phase relationships among the signals, and determining from the comparison the phase linearity of the network includes employing a Bessel function to perform at least one of receiving the signals, determining their phase relationships, comparing the determined phase relationships to expected phase relationships among the signals, and determining the phase linearity from the comparison.

78. The method of claim 71 wherein employing a Bessel function includes employing a table containing values of the Bessel function for use in evaluating the Bessel function.

79. The method of claim 65 further including producing with one of the first and second devices a signal for synchronizing the transmission by the first device and reception by the second device of the test signals.

80. The method of claim 79 further including providing in the first and second devices information concerning the test frequencies to cause the first and second devices to transmit and receive multiple test frequencies in an established sequence.

81. The method of claim 79 including transmitting the synchronizing signal on the network.

82. The method of claim 65 further including transmitting information related to the determined phase relationships through the network from one of the first and second devices to the other of the first and second devices.

83. The method of claim 82 wherein transmitting information related to the determined phase relationships through the network from one of the first and second devices to the other of the first and second devices includes transmitting the information through a network channel dedicated to the transmission of the information.

84. The method of claim 83 wherein transmitting the information through a network channel dedicated to the transmission of the information includes transmitting the information by frequency shift keying (FSK).

85. The method of claim 82 further including producing with one of the first and second devices a signal for synchronizing the transmission by the first device and reception by the second device of the test signals, transmitting information related to the determined phase relationships through the network including transmitting the information related to the determined phase relationships in the same channel as the synchronizing signal.

86. The method of claim 65 further including displaying an output related to the determined phase relationship.

* * * * *